United States Patent [19]

Schäfer

[11] 4,155,296
[45] May 22, 1979

[54] METHOD OF BINDING PRESSED BALES AND BALING PRESS FOR CARRYING OUT THE METHOD

[75] Inventor: Anton Schäfer, Langenfeld, Fed. Rep. of Germany

[73] Assignee: Lindemann Maschinenfabrik GmbH, Düsseldorf, Fed. Rep. of Germany

[21] Appl. No.: 882,113

[22] Filed: Feb. 28, 1978

[30] Foreign Application Priority Data

Mar. 3, 1977 [DE] Fed. Rep. of Germany ....... 2709248

[51] Int. Cl.$^2$ ............................................. B65B 13/28
[52] U.S. Cl. ........................................ 100/3; 100/11; 100/31
[58] Field of Search .................... 100/3, 11, 31, 17, 18, 100/19, 20, 24

[56] References Cited

U.S. PATENT DOCUMENTS

| 2,585,425 | 2/1952 | Baskerville | 100/31 X |
| 3,667,377 | 6/1972 | Persson | 100/19 |

FOREIGN PATENT DOCUMENTS 2419151 11/1975 Fed. Rep. of Germany ............. 100/31

*Primary Examiner*—Billy J. Wilhite

*Attorney, Agent, or Firm*—Toren, McGeady and Stanger

[57] ABSTRACT

A method of binding pressed bales in a pressing channel of a baling press in which the ends of two wires which form the binding are fastened together by two twist connections which are spaced apart from each other comprises the improvement of the step of pulling back one of the two wires after the twist connections have been made and the wires have been severed between the two twist connections in such a way that as the next bale is pressed in the channel, the first twist connection lies at the front edge of a longitudinal face of the bale and a second twist connection, which is subsequently formed, lies at the rear edge of the same longitudinal face. A baling press for carrying out this method comprises a conventional pressing channel with a plunger together with a conventional device for forming the wire bindings around the bales as they are pressed, but this binding device incorporates the improvement comprising a pulling member which engages one of the wires and pulls this wire back after the two wires have been severed so that the twist connection between the two wires is then located in a position such that it comes into contact with the next bale to be pressed in the pressing channel at the front edge of a longitudinal face of the bale.

5 Claims, 5 Drawing Figures

METHOD OF BINDING PRESSED BALES AND BALING PRESS FOR CARRYING OUT THE METHOD

This invention relates to methods of binding pressed bales in a pressing channel of a baling press, wherein the ends of two wires which are drawn from separate storage rolls and which extend along opposite longitudinal faces of the bale remain connected to each other from one binding operation to the next and form a band extending around the bale; one of the wires is moved behind the pressed bale in the form of a loop extending transversely to the direction of pressing from one longitudinal face to beyond the opposite longitudinal face of the bale and is there connected to the second wire by a first twist connection to form the band around the bale and is connected by an adjacent second twist connection to the second wire to form the start of a further band for the next bale, after which the parts of the wires between the two twist connections are cut. The invention also relates to apparatus for carrying out this method.

Apparatus described in German Offenlegungsschrift No. 2,419,151 performs this method. The bales bound in this way each have two twist connections in each binding band. One of these twist connections is always, owing to the construction and operation of the apparatus, at the rear, upper edge of the bale in relation to the pressing direction while the second twist connection is always approximately at the centre of the length of the bale. The mode of operation of this known binding apparatus has proved very reliable. It is only the position of the second twist connection approximately at the centre of the length of the bale that has certain disadvantages. This twist connection cannot be brought to the bale being pressed until this bale has already attained a certain minimum length, equal to about one half of its final length. Until this has happened, the second twist connection can, so to speak, be regarded as belonging still to the wire supplied from above the bale. If, due to a change of material being baled, only a very short residual bale is to be bound, then it can happen that the second twist connection reaches, during the course of the binding operation, an automatic twisting device forming part of the apparatus and this damages the device. To prevent this, it has hitherto been necessary to dispense with the automatic binding of short residual bales, but this can lead to expensive delays in operation of the baling press.

The position of the second twist connection in the known method can also result, if the bale is lifted by the binding wire, in the twist connection pulling away from contact with the face of the bale and becoming untwisted under the weight of the bale, because the wire ends can rotate freely about the twist connection.

There is also a risk, if bales are stacked one on top of another, of the second twist connection becoming hooked into the next bale above in the stack and thus giving rise to unnecessary resistance in separation of the bales or to damage of the bale or the binding.

The aim of the present invention is to provide a method as described above and apparatus for carrying out the method, which while making use of the good features of the method, ensures that the second twist connection is situated at a position which is satisfactory for further operations and handling of the bale.

To this end, according to this invention, we provide a method of binding pressed bales in a pressing channel of a baling press, wherein the ends of two wires, which are drawn from separate storage rolls and which extend along opposite longitudinal faces of the bale, remain connected to each other from one binding operation to the next and form a band extending around the bale, one of the wires being moved behind the pressed bale to form a loop extending transversely to the direction of pressing from one longitudinal face to beyond the opposite longitudinal face of the bale and is there connected to the second wire by a first twist connection to form the band around the bale and is connected by an adjacent second twist connection to the second wire to form the start of a new band for the next bale, after which the parts of the wires between the two twist connections are cut, characterised in that after the two wires have been cut, the first wire is pulled back counter to the direction in which the loop is formed and transversely to the pressing direction sufficiently far for the second twist connection to be located in a position such that it comes into contact with the next bale to be pressed in the pressing channel at the front edge of a longitudinal face of the bale.

The invention is thus based upon the concept that the wire in the loop, which is formed on the opposite side of the bale from that along which the wire extends for the purpose of twisting, is drawn back before the renewed forming of a band to receive a new bale to such an extent that the second twist connection adopts its final position at a forward edge of the new bale to be pressed. This position may be regarded as "neutral" in the sense of the difficulties explained in connection with the prior art.

The method in accordance with the present invention may suitably be carried out by a baling press which in accordance with another aspect of the invention comprises a pressing channel, means for feeding material to be baled to the channel, a pressing plunger which is reciprocable in the channel to form a succession of pressed bales in the channel and a device for binding the bales formed in the channel, the binding device comprising holders for holding two separate rolls of binding wire, means for extending wires from the rolls one along each of two opposite longitudinal faces of a formed bale, means for forming a loop from a first one of the wires, the loop extending in a direction transverse to the direction of movement of the plunger from one of the longitudinal faces to beyond the opposite longitudinal face, twisting means for forming adjacent first and second twist connections between a part of the first wire in the loop and the second wire, and means for cutting the two wires between the two twist connections, wherein a pulling member is provided and in operation, engages with the first wire, the pulling member having a drive which moves the pulling member to pull the first wire back after the wires have been cut to locate the second twist connection in the said position.

This form of construction leads with particular reliability to the desired result because the second twist connection is always formed at the same position relative to the pressing channel of the baling press, so that a constant length of wire always remains between the adjacent pressing channel wall and the position of the twist connection. This is the length by which the wire is pulled back.

The pulling member with advantage comprises a reciprocable rod, which carries a deflection roller around which, in operation, the first wire passes. The rod can either be connected to a cylinder drive or be connected to a wire pusher which constitutes the means for forming the loop in such a way that return movement of the wire pusher after forming the loop moves the rod to pull back the first wire.

The examples of methods and of apparatus in accordance with the invention will now be described with reference to the accompanying drawings, in which.

Figure 1:
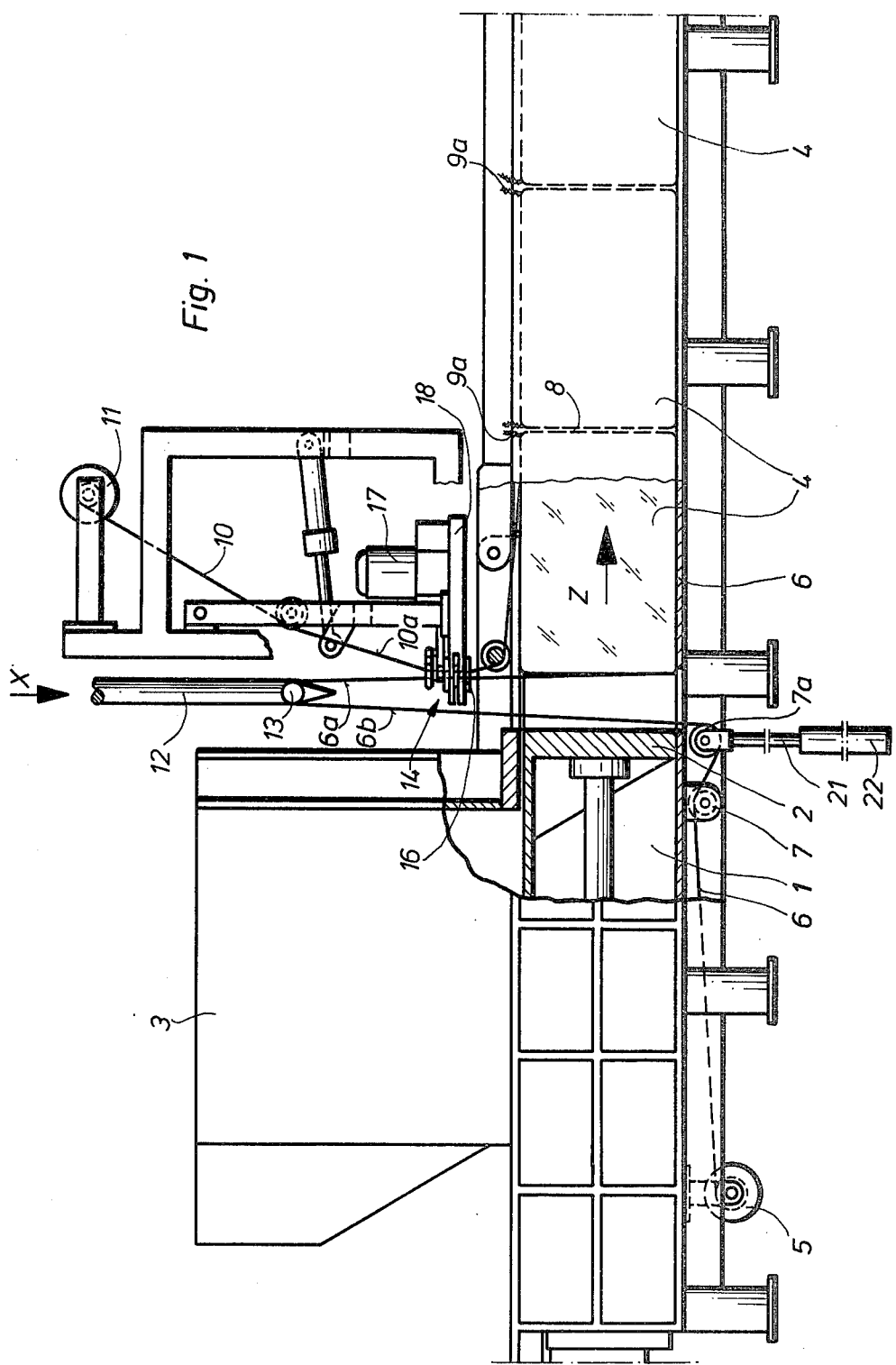
FIG. 1 is a partly sectional side view of one example of a baling press having a binding device for binding bales shown at a stage of operation just before the start of the formation of a twist connection.

A baling press comprises a pressing plunger 2, which is reciprocable by a drive, not shown, in a rectangular pressing channel 1. When the plunger 2 is retracted, material to be baled such as waste paper, is introduced through a filling shaft 3 from above into the pressing channel 1. To produce each bale, several working strokes of the pressing plunger are necessary. In the pressing channel 1, as shown in FIG. 1, three pressed bales 4 of waste paper are already situated. The central and right band bale have already been bound, while the left-hand bale is about to have its binding completed. Usually, the bale is bound with several bands of wire alongside one another. There are therefore a number of sets of elements of the binding device. For the sake of simplicity, however, only one binding in a single plane is described below.

From a lower storage roll 5, a first wire 6 extends beneath the pressing channel 1 around a deflection roller 7 and a further deflection roller 7a, the purpose of which will be explained in more detail below. The wire 6 then passes around the forward end face 8 of a bale just about to be bound and is connected, at the forward, upper edge of this bale, by means of a twist connection 9a the formation of which will be described later, to a second wire 10, which is drawn from an upper storage roll 11. In each binding plane there is a binding needle 12 with hooks 13, the needle being movable up and down in the direction of its longitudinal axis. This needle is arranged to pass through the pressing channel 1 and through a groove 2a, formed in the front of the pressing plunger 2, in the direction of arrow X (FIG. 1) and transversely to the pressing direction Z and to lift from the first wire 6 a loop 6a, 6b to beyond the upper edge of the pressing channel, so that the wire lengths 6a and 10a (FIG. 2) which are to be twisted together, extend closely alongside and approximately parallel to each other.

Figure 2:
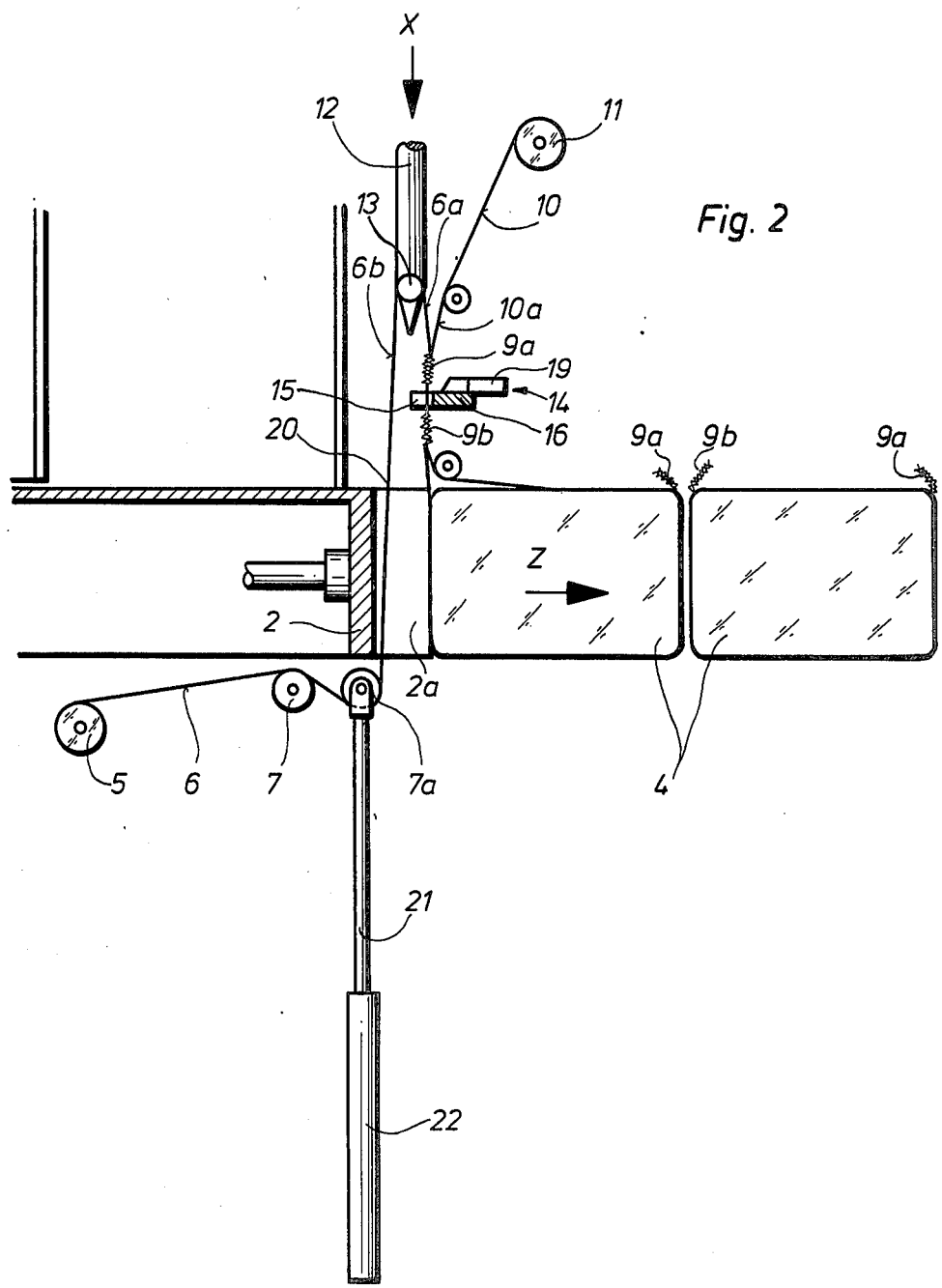
FIG. 2 is a simplified side view of the binding device of the press shown in FIG. 1 after completion of the twist connection.

The twisting operation is carried out in a known manner by means of a rotary twisting and cutting device 14, which is shown in FIG. 1 in an operative position, so that the aforementioned wire lengths 6a and 10a have been seized by a twist slit 15 in a twist wheel 16. The twist wheel is then rotated by a motor 17 driving through a gear situated in a housing 18 which carries the motor. Thus, as shown in FIG. 2, one twist connection 9a is formed above the twist wheel and one twist connection 9b below the twist wheel, the twist connections being separated from each other by a cutting device 19. The twist connection 9b closes the wire band surrounding a finished bale, while the twist connection 9a maintains the connection between the wires 6 and 10.

In the usual mode of operation, the bale pressing operation is continued after the wire 6 has been unhooked from the hooks 13 of the binding needle 12. In this mode of operation, the twist connection 9a does not come up against the new bale until the bale has reached a length equal to the length of wire between the point 20 (FIG. 2) and the twist connection 9a. This undesired position of the twist connection 9a is avoided by the method in accordance with the present invention.

For this purpose, the deflection roller 7a is connected by a piston rod 21, to a cylinder drive 22, the stroke length of which is equal to the length of the wire between the point 20 and twist connection 9a as seen in FIG. 2.

Figure 3:
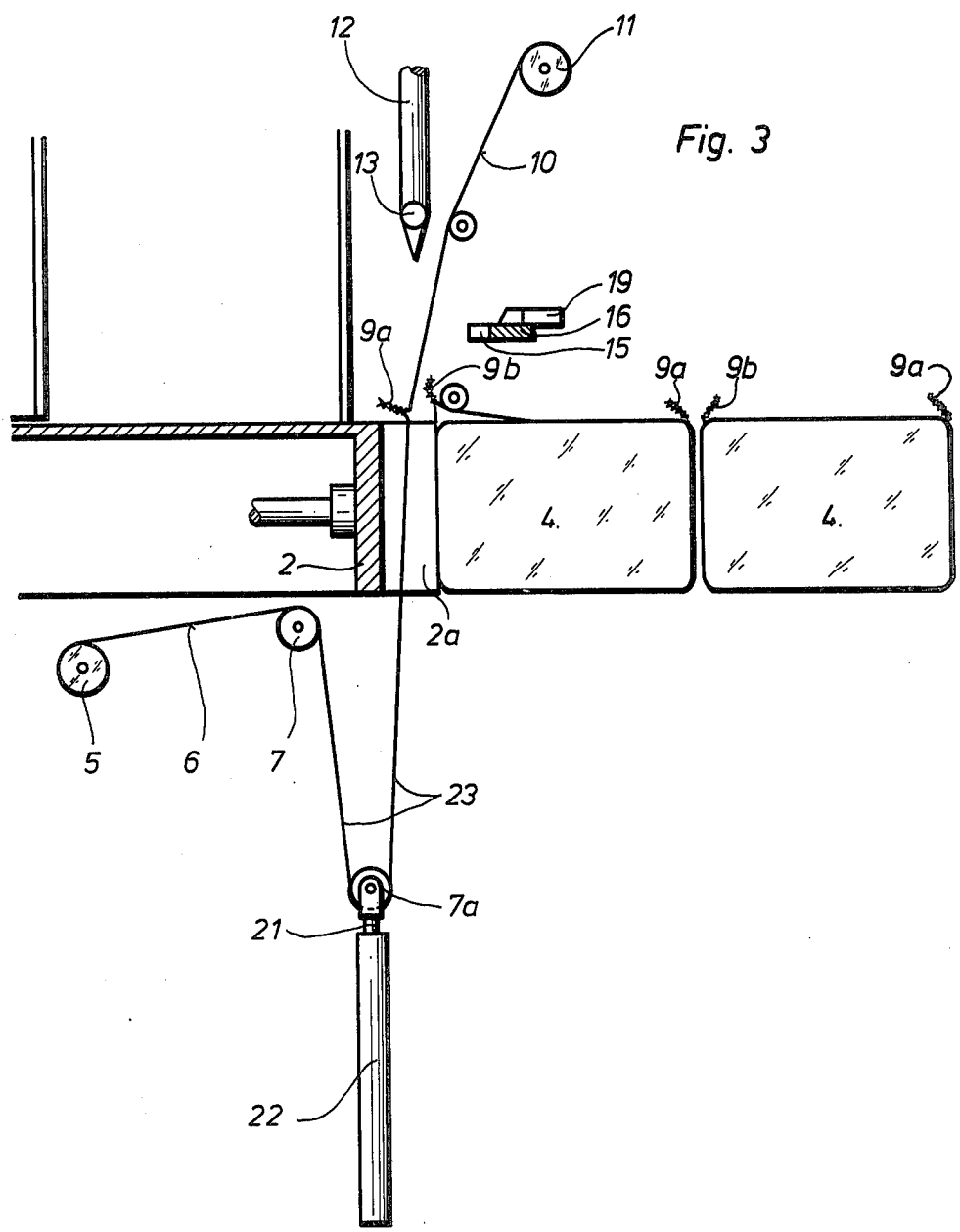
FIG. 3 is a view similar to that of FIG. 2, but at a later stage of operation, after the pulling back of the first wire.

In FIG. 3, the cylider drive 22 has retracted the piston rod 21 by the aforementioned stroke before the start of the next bale pressing operation. The twist connection 9a has thus been moved to a position directly adjacent the twist connection 9b, so that it can come into contact with the new bale as desired at the forward, upper edge of the new bale to be formed against the wire 6. After the start of the pressing operation, the cylinder drive 22 moves the piston rod 21 back into the position shown in FIGS. 1 and 2, in order that the wire in the loop 23 shown in FIG. 3 can be used in the ensuing binding operation.

Figure 4:
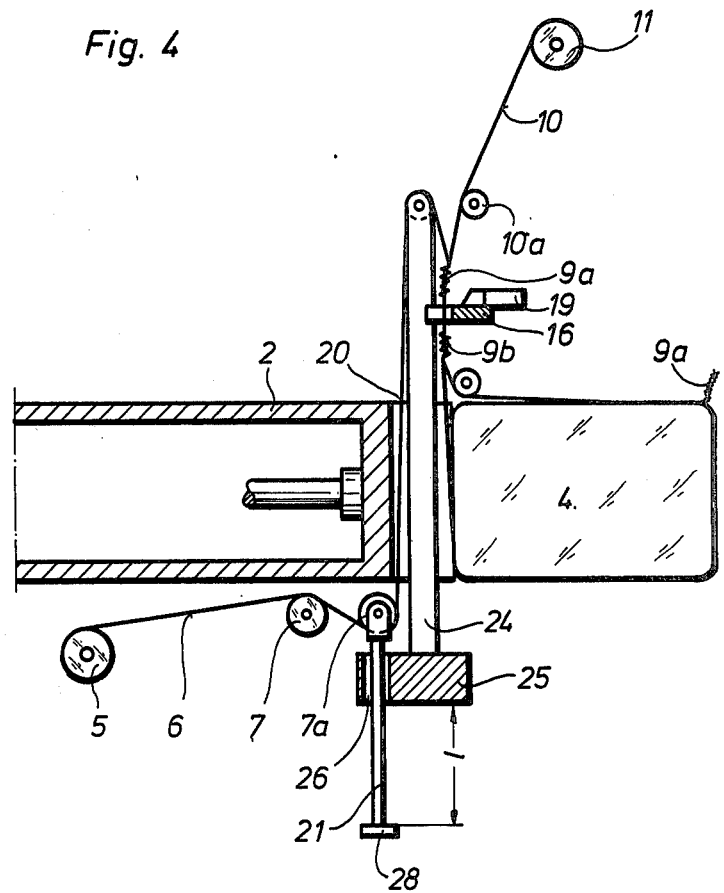
FIG. 4 is a plan view of another form of binding device which forms a binding in a horizontal plane, the device being shown at a stage of operation after completion of a twist connection; and, FIG. 5 is a view similar to that of FIG. 4, but at a later stage of operation after pulling back of the first wire.
Figure 5:
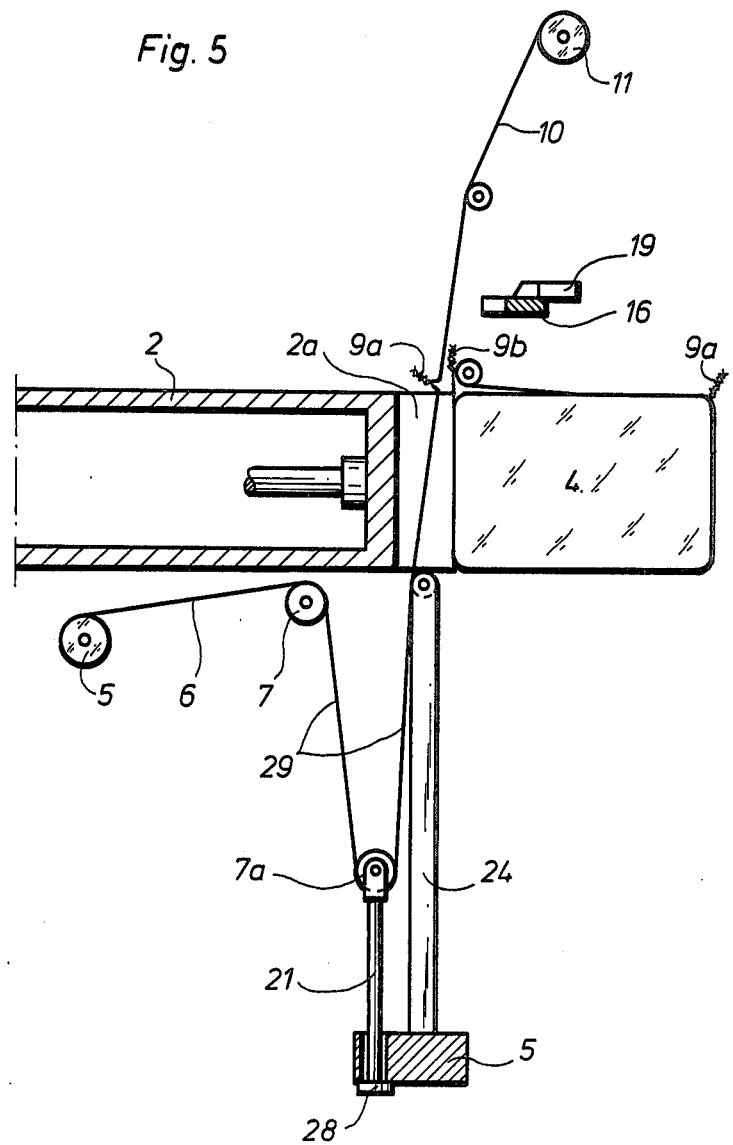

It is described in German Offenlegungsschrift No. 2,253,160 that, instead of the binding needle 12 shown in FIGS. 1 to 3, which operates by pulling to form the wire loop consisting of the wire lengths 6a, 6b, a horizontally operating wire pusher 24 as shown in FIG. 4 may be used. The forming of the twist connections 9a, 9b and the subsequent cutting of the wires between these points is carried out in the same manner as already explained with reference to FIGS. 1 to 3. The wire pusher 24 carries an abutment plate 25 having an opening 26, through which the rod 21, which carries the deflection roller 7a, passes. An abutment flange 28 is fixed to the end of the rod 21 remote from the deflection roller 7a. The distance 1 between the abutment plate 25 and the abutment flange 28 is arranged so that the wire pusher 24, during its return stroke into the at-rest position shown in FIG. 5 starts to carry the abutment flange 28 with it when its residual stroke is just equal to the length of wire which must be pulled back in order to bring the twist connection 9a into the desired position. The wire in the loop 29 then formed is consumed during the next working stroke of the wire pusher 24 in forming the next binding.

I claim:

1. In a method of binding pressed bales in a pressing channel of a baling press, said method comprising the steps of drawing the ends of two wires from separate storage rolls, extending said wires along opposite longitudinal faces of said bale, maintaining said wires connected to each other during successive binding operations, forming a band extending around the bale by moving a first one of the wires behind the pressed bale to form a loop which extends transversely to the direction of pressing and extends from one longitudinal face of said bale to beyond an opposite longitudinal face of said bale, connecting said first wire in said loop to said second wire by a first twist connection to form said band around said bale, connecting said first wire in said loop to said second wire by an adjacent second twist connection and severing the parts of said first and second wires between said two twist connections, the improvement comprising the further step, after said wires have been severed, of pulling said first wire back in a direction counter to the direction in which said loop is formed and transversely to said pressing direction, said first wire being pulled back for a distance such that said second twist connection is located in a position such that it comes into contact with a subsequent bale pressed in said pressing channel at the front edge of a longitudinal face of said bale.

2. In a baling press for pressing and baling compressible material, said press comprising a pressing channel, means for feeding said material to said channel, a pressing plunger in said channel, means for reciprocating said pressing plunger in said channel to compress said material fed to said channel and form a succession of pressed bales in said channel, and a binding device for binding said bales pressed in said channel, said binding device including holders for holding two separate rolls of binding wire, means for extending wires from each of said rolls one along each of two opposite longitudinal faces of a bale as it is pressed in said channel, means for forming a loop from a first one of said wires, said loop extending from said one of said longitudinal faces along which said first wire extends to beyond said opposite longitudinal face in a direction transverse to the direction of reciprocation of said plunbger, twisting means for forming adjacent first and second twist connections between a portion of said first wire in said loop and said second wire, and means for severing said two wires between said two twist connections, the improvement comprising a pulling member, means on said pulling member for engaging said first wire, and drive means for moving said pulling member to pull said first wire back after said wires have been severed to locate said second twist connection in a position such that it comes into contact with a subsequent bale pressed in said pressing channel at the front edge of a longitudinal face of said bale.

3. A baling press as claimed in claim 2, wherein said pulling member comprises a rod, said means for engaging said first wire comprises a deflection roller rotatably mounted on said rod and around which, in operation, said first wire passes, and said drive means includes means for reciprocating said rod.

4. A baling press as claimed in claim 3, wherein said drive means for reciprocating said rod comprises a cylinder drive.

5. A baling press as claimed in claim 3, wherein said means for forming said loop includes a wire pusher and means for reciprocating said wire pusher and further comprising lost motion means connecting said rod to said wire pusher whereby said rod partakes of part of said movement of said wire pusher, and return movement of said wire pusher after forming said loop moves said rod to pull back said first wire.

* * * * *